United States Patent [19]

Hull

[11] Patent Number: 4,647,278
[45] Date of Patent: Mar. 3, 1987

[54] ENDLESS POWER TRANSMISSION BELT CONSTRUCTION AND METHOD OF MAKING THE SAME

[75] Inventor: Matthew L. Hull, Springfield, Mo.

[73] Assignee: Dayco Corporation, Dayton, Ohio

[21] Appl. No.: 828,417

[22] Filed: Feb. 11, 1986

[51] Int. Cl.⁴ ............................................. F16G 1/28
[52] U.S. Cl. .................................... 474/205; 474/250
[58] Field of Search ................ 474/202, 205, 250, 249

[56] References Cited

U.S. PATENT DOCUMENTS

| | | | |
|---|---|---|---|
| 2,728,239 | 12/1955 | Adams, Jr. ........................... | 474/205 |
| 2,802,511 | 8/1957 | Waugh .................................. | 154/4 |
| 4,002,082 | 1/1977 | Waugh .................................. | 474/205 |
| 4,011,766 | 3/1977 | Waugh ............................. | 474/250 X |
| 4,332,576 | 1/1982 | Stecklein et al. ..................... | 474/205 |

*Primary Examiner*—James A. Leppink
*Assistant Examiner*—Frank H. McKenzie, Jr.
*Attorney, Agent, or Firm*—Joseph V. Tassone

[57] ABSTRACT

An endless power transmission belt construction and method of making the same are provided, the belt construction comprising an outer tension section, an inner compression section and a load-carrying section secured to and disposed intermediate the tension section and the compression section, the compression section having an inner surface defining a plurality of longitudinally disposed and alternately spaced apart projections and grooves and a plurality of transversely disposed and alternately spaced apart projections and grooves. Each transverse groove has a depth between approximately 0.070 of an inch and approximately 0.080 of an inch and is spaced from the next adjacent transverse groove thereto by a distance between approximately 0.3 of an inch and approximately 0.4 of an inch while each longitudinal groove has a depth of approximately 0.095 of an inch and is spaced from the next adjacent longitudinal groove thereto by a distance of approximately 0.140 of an inch.

20 Claims, 4 Drawing Figures

ENDLESS POWER TRANSMISSION BELT CONSTRUCTION AND METHOD OF MAKING THE SAME

BACKGROUND OF THE INVENTION

1. Field of the Invention

This invention relates to a new endless power transmission belt construction and to a new method for making an endless power transmission belt construction.

2. Prior Art Statement

It is known to provide an endless power transmission belt construction comprising an outer tension section, an inner compression section, and a load-carrying section secured to and disposed intermediate the tension section and the compression section, the compression section having an inner surface means defining a plurality of longitudinally disposed and alternately spaced apart projections and grooves and a plurality of transversely disposed and alternately spaced apart projections and grooves. For example, see the U.S. patents to Waugh, U.S. Pat. Nos. 2,802,511 and 4,002,080, and the U.S. patent to Adams, Jr., U.S. Pat. No. 2,728,239.

SUMMARY OF THE INVENTION

It is one feature of this invention to provide a new endless power transmission belt construction that has conventional longitudinally disposed ribs and grooves formed in the bottom surface of the compression section thereof.

In particular, it was found according to the teachings of this invention, that the inner surface means of the compression section of such a belt construction can have the plurality of transversely disposed and alternately spaced apart projections and grooves formed therein with particular dimensions in relation to the particular dimensions of the longitudinally disposed and alternately spaced apart projections and grooves thereof so as to improve the belt life of the resulting belt, which, in one example of this invention, improved the belt life thereof by approximately 250% in comparison with an equivalent belt construction that only had the same longitudinal projections and grooves therein.

For example, one embodiment of this invention provides an endless power transmisson belt construction comprising an outer tension section, an inner compression section, and a load-carrying section secured to and disposed intermediate the tension section and the compression section, the compression section having an inner surface means defining a plurality of longitudinally disposed and alternately spaced apart projections and grooves and a plurality of transversely disposed and alternately spaced apart projections and grooves, each transverse groove having a depth between approximately 0.070 of an inch and approximately 0.080 of an inch and is spaced from the next adjacent transverse groove thereto a distance between approximately 0.3 of an inch and approximately 0.4 of an inch while each conventional groove has a depth of approximately 0.095 of an inch and is spaced from the next adjacent longitudinal groove thereto by a distance of approximately 0.140 of an inch.

Accordingly, it is an object of this invention to provide a new endless power transmission belt construction having one or more of the novel features of this invention as set forth above or hereinafter shown or described.

Another object of this invention is to provide a new method of making an endless power transmission belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
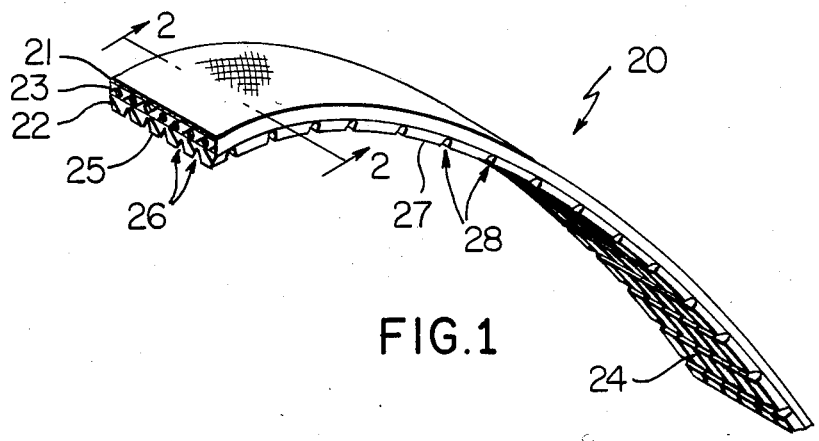
FIG. 1 is a broken away perspective view of the new endless power transmission belt construction of this invention.

While the various features of this invention are hereinafter illustrated and described as being particularly adapted to provide an endless power transmission belt construction having longitudinal ribs or projections on the bottom surface means thereof for mating with similar structure on a pulley or the like, it is to be understood that the various features of this invention can be utilized singly or in various combinations thereof to provide an endless power transmission belt construction for other uses as desired.

Therefore, this invention is not to be limited to only the embodiments illustrated in the drawings, because the drawings are merely utilized to illustrate one of the wide variety of uses of this invention.

Figure 2:
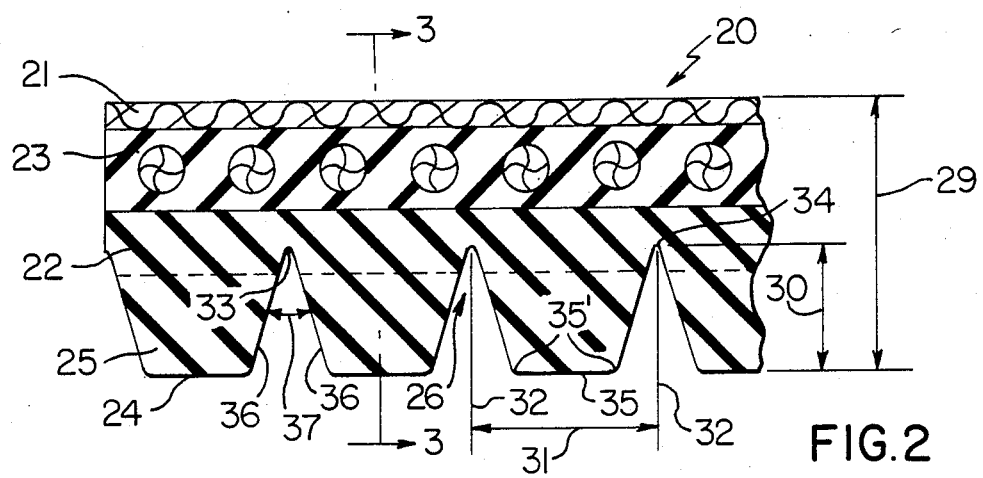
FIG. 2 is an enlarged, fragmentary cross-sectional view taken on line 2—2 of FIG. 1.
Figure 3:
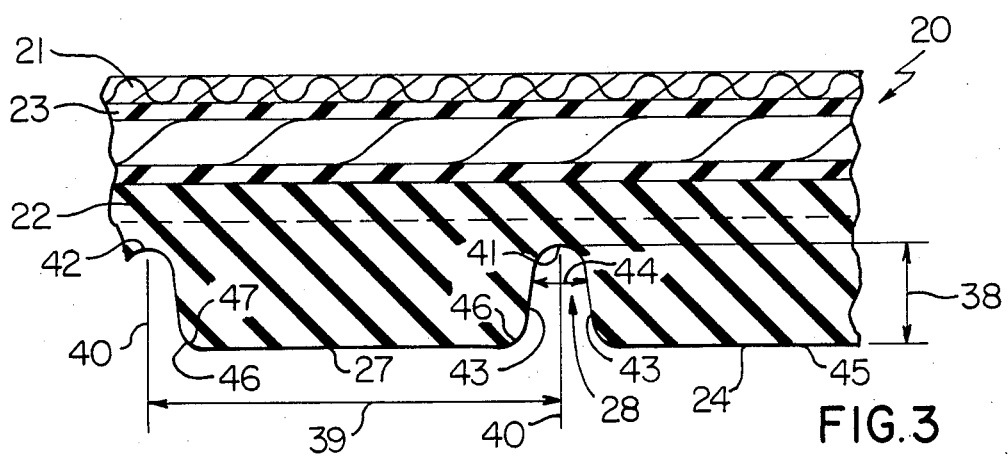
FIG. 3 is a fragmentary cross-sectional view taken on line 3—3 of FIG. 2.

Referring now to FIGS. 1–3, the new endless power transmission belt construction of this invention is generally indicated by the reference numeral 20 and comprises an outer tension section 21, an inner compression section 22 and a load carrying section 23 secured to and disposed intermediate the tension section 21 and the compression section 22, the sections 21, 22 and 23 of the belt construction 20 being formed of conventional materials, such as mainly of polymeric materials, and in a conventional manner as is well known in the art of making endless power transmission belt constructions whereby such materials and methods need not be specifically described as the same are well known in the art.

The compression section 22 of the belt construction 20 has an inner surface means 24 defining, in a manner hereinafter set forth, a plurality of longitudinally disposed and alternately spaced apart projections 25 and grooves 26 that are disposed substantially parallel to each other throughout the length thereof and a plurality of transversely disposed and alternately spaced apart projections 27 and grooves 28 that are disposed substantially parallel to each other throughout the length of the belt construction 20, the transverse projections 27 and grooves 28 being disposed substantially perpendicular to the longitudinal projections 25 and grooves 26 and forming a pattern in the surface means 24 as best illustrated in FIG. 1.

As previously stated, it is known from the aforementioned U.S. patents to Waugh, U.S. Pat. Nos. 2,802,511 and 4,002,082, and the U.S. patent to Adams, Jr., U.S.

Pat. No. 2,728,239, that the combination of a plurality of transversely disposed and alternately spaced apart projections and grooves in an endless power transmission belt construction that has a plurality of longitudinally disposed and alternately spaced apart projections and grooves enhances the flexibility of the belt construction for use around pulleys of small diameters whereby these three patents are being incorporated into this disclosure by this reference thereto.

It was found according to the teachings of this invention that if the transverse grooves 28 (or transverse grooves 28A of FIG. 4) each has a depth between approximately 0.070 of an inch and approximately 0.080 of an inch and is spaced from the next adjacent transverse groove 28 (or 28A) by a distance between approximately 0.3 of an inch and approximately 0.4 of an inch while each longitudinal groove 26 (or 26A) has a depth of approximately 0.095 of an inch and is spaced from the next adjacent longitudinal groove 26 (or 26A) thereto by a distance of approximately 0.140 of an inch, the belt life of the resulting belt construction is substantially improved over the belt life of an equivalent belt construction that merely has the plurality of longitudinally disposed and alternately spaced apart projections 25 and grooves 26 formed of the dimensions previously set forth but without any transversely disposed and alternately spaced apart projections and grooves therein.

In particular, the belt construction 20 of FIGS. 1–3 was formed in a conventional manner by first molding the transverse projections 27 and grooves 28 into the compression section 22 by utilizing an internally ribbed curing jacket that was compressed against the compression section 22 by steam and pressure in a conventional manner of forming a bottom cogged or bottom toothed belt construction during a heat curing operation on the belt construction. For example, see the aforementioned U.S. patent to Waugh for a disclosure of such a method.

Thereafter, the longitudinally disposed projections 25 and grooves 26 were cut into a thus molded and cured belt construction 20 by a fly cutting operation as fully disclosed and claimed in the patent to Hetz, U.S. Pat. No. 2,496,269 whereby this patent is being incorporated into this disclosure by this reference thereto.

However, it is believed according to the teachings of this invention that the building of the belt construction 20 of this invention and the forming of the transverse projections 27 and grooves 28 as well as the forming of the longitudinally disposed projections 25 and grooves 26 could be made in other manners as desired.

For example, it is believed that the longitudinally disposed projections 25 and grooves 26 could be molded at the same time that the transverse projections 27 and grooves 28 are being molded into the compression section 22.

Also, it is believed that the longitudinally disposed projections 25 and grooves 26 could be cut by a grinding operation rather than by a milling operation, if desired.

In any event, the particular belt constructions 20 of this invention were formed so as to each have a belt thickness 29 of approximately 0.206 of an inch (with a tolerance of approximately +0.030 to approximately −0.023 of an inch) while the depth 30 of the longitudinal grooves 26 is approximately 0.095 (+ or −0.010) of an inch and the pitch or distance 31 between the center lines 32 of adjacent grooves 26 was approximately 0.140 (+ or −0.002) of an inch. The bottom 33 of each longitudinal groove 26 was defined by a radius 34 of approximately 0.004 (+ or −0.002) of an inch while the longitudinal projections 25 each had a substantially flat free end surface 35 that was not cut away and thereby was as molded. However, the cutting operation to form the longitudinal projections 25 and grooves 26 caused the projections 25 to have substantially flat facing faces 36 that respectively defined an angle 37 therebetween of approximately 40° (+ or −2.8°). Also, such cutting operation for forming the longitudinal projections 25 and grooves 26 formed the opposed ends 35' of the free ends 35 of the projections 25 to each have a radius of approximately 0.010 (+ or −0.002) of an inch.

The molded transverse grooves 28 of such belt constructions 20 each have a depth 38 of approximately 0.078 (+ or −0.01) of an inch while the pitch or distance 39 between the center lines 40 of adjacent grooves 28 thereof is approximately 0.313 (+ or −0.03) of an inch. The bottom 41 of each transverse groove 28 is defined by a radius 42 of approximately 0.031 of an inch while the substantially flat facing faces 43 of the adjacent transverse projections 27 define an angle 44 therebetween of approximately 10°. Each transverse projection 27 of such belt constructions 20 has a substantially flat free end or bottom surface 45 that is formed by the aforementioned molding operation and has opposed ends 26 that are each defined by a radius 47 of approximately 0.031 of an inch.

Such previously made belt constructions 20 of FIGS. 1–3 were each formed mainly of polymeric materials, were approximately 0.840 of an inch wide and were approximately 43.6 inches in length.

Figure 4:
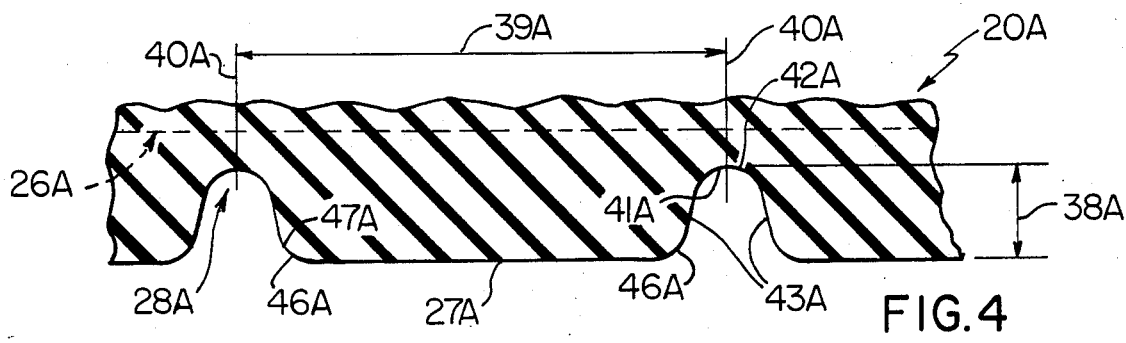
FIG. 4 is a view similar to FIG. 3 and illustrates another embodiment of the endless power transmission belt construction of this invention.

The belt construction 20A illustrated in FIG. 4 is substantially the same as the belt construction 20 previously described with the only difference being that the pitch or distance 39A between the center lines 40A of adjacent transverse grooves 28A is approximately 0.391 of an inch while the depth 38A of each transverse groove 28A is approximately 0.070 of an inch. Also, the faces 43A of the transverse projections 27A are each disposed at an angle of approximately 10° relative to its respective center line 40A whereas in the belt construction 20 each face 43 is disposed at an angle of approximately 5° relative to its respective center line 40. In addition, the bottom 41A of each transverse groove 28A has its radius 42A of approximately 0.047 of an inch while the end 46A of each transverse projection 27A has its radius 47A of approximately 0.047 of an inch.

A belt construction formed in the configuration of FIG. 4 was tested and was found to have a belt life of approximately 250% relative to the belt life of an equivalent belt construction that did not have any transverse projections and grooves therein.

Therefore, it can be seen that this invention provides a new endless power transmission belt construction, as well as a new method of making an endless power transmission belt construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an endless power transmission belt construction comprising an outer tension section, an inner compression section, and a load carrying section secured to and disposed intermediate said tension section and said compression section, said compression section having an inner surface means defining a plurality of longitudinally disposed and alternately spaced apart projections and grooves and a plurality of transversely disposed and alternately spaced apart projections and grooves, the improvement wherein each transverse groove has a depth between approximately 0.070 of an inch and approximately 0.080 of an inch and is spaced from the next adjacent transverse groove thereto by a distance between approximately 0.3 of an inch and approximately 0.4 of an inch while each longitudinal groove has a depth of approximately 0.095 of an inch and is spaced from the next adjacent longitudinal groove thereto by a distance of approximately 0.140 of an inch.

2. A belt construction as set forth in claim 1 wherein each transverse groove has a bottom that is defined by a radius.

3. A belt construction as set forth in claim 2 wherein the length of said radius is between approximately 0.030 of an inch and approximately 0.050 of an inch.

4. A belt construction as set forth in claim 2 wherein each transverse projection has a substantially flat face facing the flat face of the next adjacent transverse projection.

5. A belt construction as set forth in claim 4 wherein each said flat face of each said transverse projection makes an acute angle with a centerline of its respective transverse groove.

6. A belt construction as set forth in claim 5 wherein each said acute angle is approximately 5°.

7. A belt construction as set forth in claim 1 wherein said transverse projections and said transverse grooves had been molded in said compression section.

8. A belt construction as set forth in claim 1 wherein each said transverse projection has a substantially flat free end.

9. A belt construction as set forth in claim 1 wherein each said longitudinal groove had been cut into said compression section.

10. A belt construction as set forth in claim 1 wherein said belt construction has a thickness of approximately 0.2 of an inch.

11. In a method of making an endless power transmission belt construction comprising an outer tension section and an inner compression section with a load carrying section secured to and disposed intermediate said tension section and said compression section, said method comprising the step of forming said compression section to have an inner surface means defined by a plurality of longitudinally disposed and alternately spaced apart projections and grooves and a plurality of transversely disposed and alternately spaced apart projections and grooves, the improvement wherein the step of forming causes each transverse groove to have a depth between approximately 0.070 of an inch and approximately 0.080 of an inch and be spaced from the next adjacent transverse groove thereto by a distance between approximately 0.3 of an inch and approximately 0.4 of an inch while causing each longitudinal groove to have a depth of approximately 0.095 of an inch and be spaced from the next adjacent longitudinal groove thereto by a distance of approximately 0.140 of an inch.

12. A method of making a belt construction as set forth in claim 11 wherein the step of forming causes each transverse groove to have a bottom that is defined by a radius.

13. A method of making a belt construction as set forth in claim 12 wherein the step of forming causes the length of said radius to be between approximately 0.030 of an inch and approximately 0.050 of an inch.

14. A method of making a belt construction as set forth in claim 12 wherein the step of forming causes each transverse projection to have a substantially flat face facing the flat face of the next adjacent transverse projection.

15. A method of making a belt construction as set forth in claim 14 wherein the step of forming causes each said flat face of each said transverse projection to make an acute angle with a centerline of its respective transverse groove.

16. A method of making a belt construction as set forth in claim 15 wherein the step of forming causes each said acute angle to be approximately 5°.

17. A method of making a belt construction as set forth in claim 11 wherein the step of forming comprises the step of molding said transverse projections and said transverse grooves in said compression section.

18. A method of making a belt construction as set forth in claim 11 wherein the step of forming causes each said transverse projection to have a substantially flat free end.

19. A method of making a belt construction as set forth in claim 11 wherein the step of forming comprises the step of cutting each said longitudinal groove into said compression section.

20. A method of making a belt construction as set forth in claim 11 and including the step of forming said belt construction to have a thickness of approximately 0.2 of an inch.

* * * * *